W. C. KELLUM.
Clock Escapement.
No. 83,775. Patented Nov. 3, 1868.
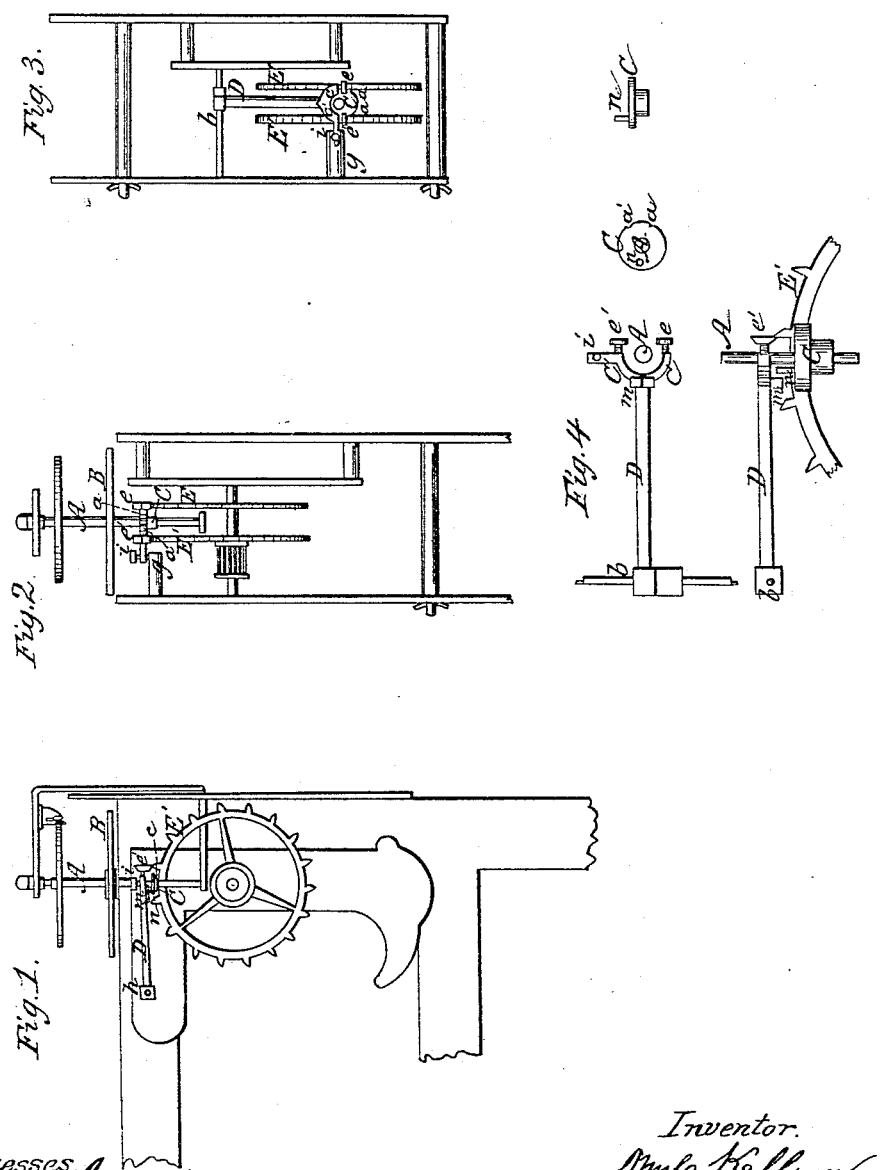
Witnesses.
C. W. M. Smith
J. L. Boone
Inventor.
Wm. C. Kellum

WILLIAM C. KELLUM, OF SAN FRANCISCO, CALIFORNIA.

Letters Patent No. 83,775, dated November 3, 1868.

IMPROVEMENT IN CLOCK-ESCAPEMENT.

The Schedule referred to in these Letters Patent and making part of the same.

*To all whom it may concern:*

Be it known that I, WILLIAM C. KELLUM, of the city and county of San Francisco, State of California, have invented an Improved Escapement for Time-Pieces; and I do hereby declare the following description and accompanying drawings are sufficient to enable any person skilled in the art or science to which it most nearly appertains, to make and use my said invention or improvements without further invention or experiment.

The object of my invention is to provide an improved escapement for time-pieces, this improvement consisting in constructing a detent-lever with two arms having locking-screws at their ends, said lever being raised by a bevelled screw, and the extent of its fall adjusted by a set-screw in a side arm or projection; also, in combining with a detent so constructed, two pallets on the same roller, and two parallel and symmetrical sets of escape-teeth connected to the same axis.

To more fully explain my invention, reference is had to the accompanying drawings, forming a part of this specification, of which—

Figure 1 is a side elevation of the escapement.
Figure 2 is a back view.
Figure 3 is a plan.

Similar letters of reference in each of the figures indicate like parts.

A is the balance-staff, standing perpendicularly, and carrying the balance B. Below the balance on the staff is the roller C, having the notches $a$ $a'$ in its periphery, one of which receives an impulse from one set of teeth in one direction, and the other in the opposite direction from the other set of teeth.

There are two sets of escape-wheel teeth, E E', turning in parallel vertical planes, and attached to the same axis at such a distance apart as to allow the roller to turn between them, and receive an impulse from each one alternately. These teeth may be attached to two wheels, as shown in the drawings, or they may be placed on each side of one wheel, and be bent up so as to receive the impulse.

The detent-lever D is pivoted at $b$, so as to move freely, and is forked at the other end, the two branches $c$ $c'$ extending, one on each side of the balance-staff A, and having each an adjustable screw, $e$ $e'$, which locks the teeth of the wheels E E' alternately.

Upon the branch $c'$ of the lock-lever is a small adjusting-screw, $i$, resting on the projection $g$, by which the screws $e$ $e'$ are raised or lowered.

The under part of the lever has a small projecting adjusting-screw, $m$, forming a double inclined plane just over the roller C. A pin, $n$, projects upward from the roller, which strikes this plane at each vibration of the balance, and thus knocks off the detent-screws $e$ $e'$ alternately, the roller C and balance B receiving an impulse each time.

The detent may lock by gravitation or by the use of a spring, and the action is rendered very delicate, while, by means of the detent and adjusting-screws $e$ $e'$ and $i$, the adjustment can be very nicely made.

Having thus described my invention,

What I claim, and desired to secure by Letters Patent, is—

1. The detent-lever D, with the locking-screws $e$ $e'$, the adjusting-screw $i$, and the screw $m$, combined and arranged substantially as and for the purpose described.

2. In combination with the pallets $a$ $a'$ and the locking-screws or heads $e$ $e'$, the two parallel and symmetrical sets of escape-teeth, E E', arranged and operating substantially as described.

In witness whereof, I have hereunto set my hand and seal.

WM. C. KELLUM. [L. S.]

Witnesses:
C. W. M. SMITH,
J. L. BOONE.